Figure 1:
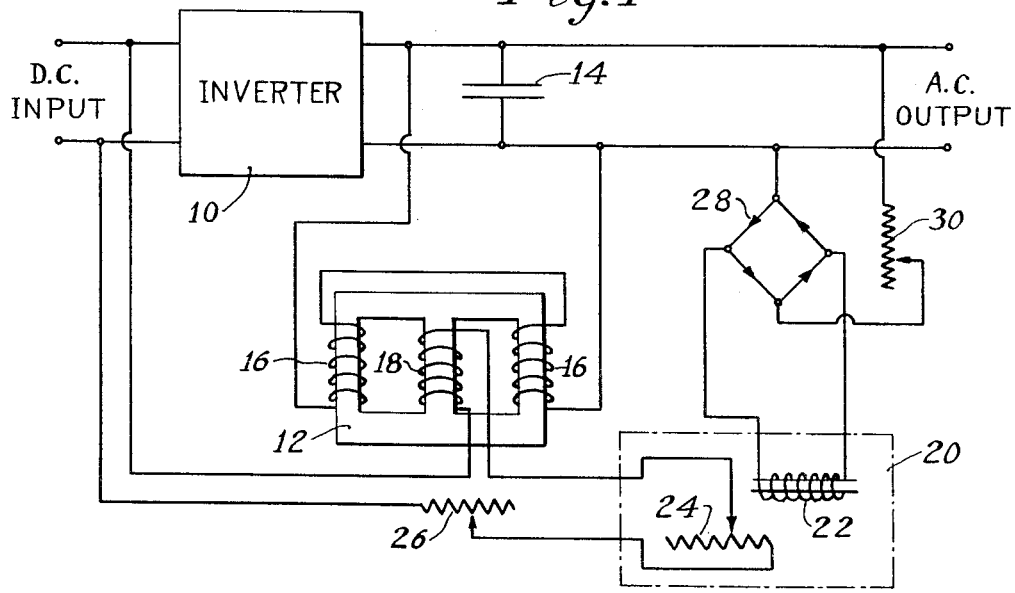

March 16, 1948.   S. SARETZKY   2,437,837
VOLTAGE REGULATOR
Filed Oct. 28, 1944   2 Sheets-Sheet 1

Inventor
Simon Saretzky
by his attorneys
Churchill & Jenney

March 16, 1948.  S. SARETZKY  2,437,837
VOLTAGE REGULATOR
Filed Oct. 28, 1944  2 Sheets-Sheet 2

Inventor
Simon Saretzky
by his attorneys
Churchill & Janney

Patented Mar. 16, 1948

2,437,837

UNITED STATES PATENT OFFICE 2,437,837

VOLTAGE REGULATOR

Simon Saretzky, Brookline, Mass., assignor to First Industrial Corporation, Boston, Mass., a corporation of Delaware Application October 28, 1944, Serial No. 560,797

3 Claims. (Cl. 171—242)

The present invention relates to voltage regulators, and more particularly to voltage regulating systems for use in conjunction with inverters by which direct current, as from storage batteries, is transformed into alternating current.

It is generally true of inverters that the actual output voltage will vary considerably with the A. C. load on the system, and also with the D. C. voltage of the input as affected by the condition of the batteries and the total load thereon. Output voltage variations substantially in excess of those permissible for A. C. operated equipment may occur as a result of merely normal changes in load and D. C. input voltage.

It is therefore an object of the invention to provide a simple and compact voltage regulating system by which the output of an inverter may automatically be maintained substantially constant over wide ranges of A. C. load and of D. C. input voltages, with the amplitude factor of the regulated output voltage held close to optimum over the entire operating range.

To this end, the regulator of the invention comprises a variable reactive load consisting of a tuned circuit comprising capacitance in parallel with a variable inductance of the saturable core type. Changes in output voltage, whether caused by changes in A. C. load or by variation in the D. C. supply voltage are automatically caused to vary the saturation of the reactor in a manner which yields a voltage drop if the net reactance of the circuit is inductive and a voltage rise (or negative drop) if the net reactance is capacitive. By employing a reactor wherein the A. C. flux density is relatively small as compared with the D. C. flux density at any point within the operating range of the latter, the A. C. excursion over the magnetization curve is small and therefore substantially linear, with the result that harmonics are minimized and the amplitude factor maintained close to optimum. Amplitude factor is defined as the ratio of peak voltage to RMS voltage and is 1.41 for a pure sine wave. The presence of harmonics that tend to increase the peak are reflected in the amplitude factor.

An important feature of the invention comprises amplifying means whereby the saturating current is amplified, preferably by means of a magnetically controlled resistor, whereby the reactance of the control circuit is made highly sensitive to slight changes in output voltage, with the result that the voltage may be held within narrow limits.

Figure 2:
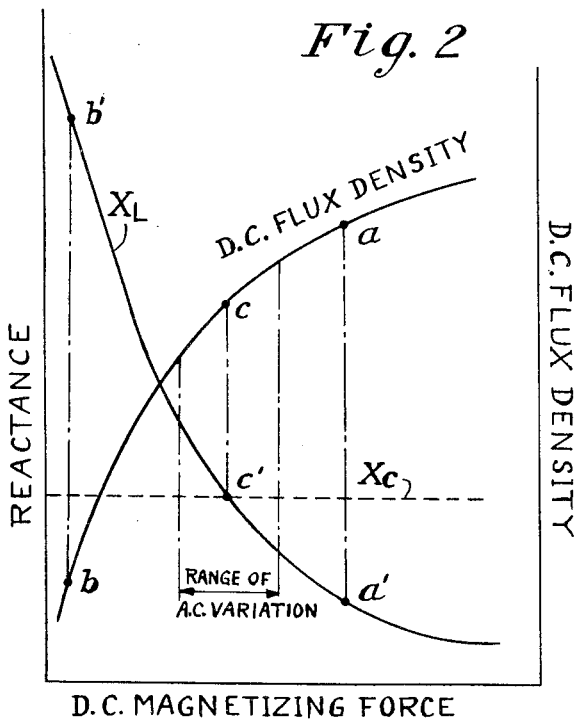
Figure 5:
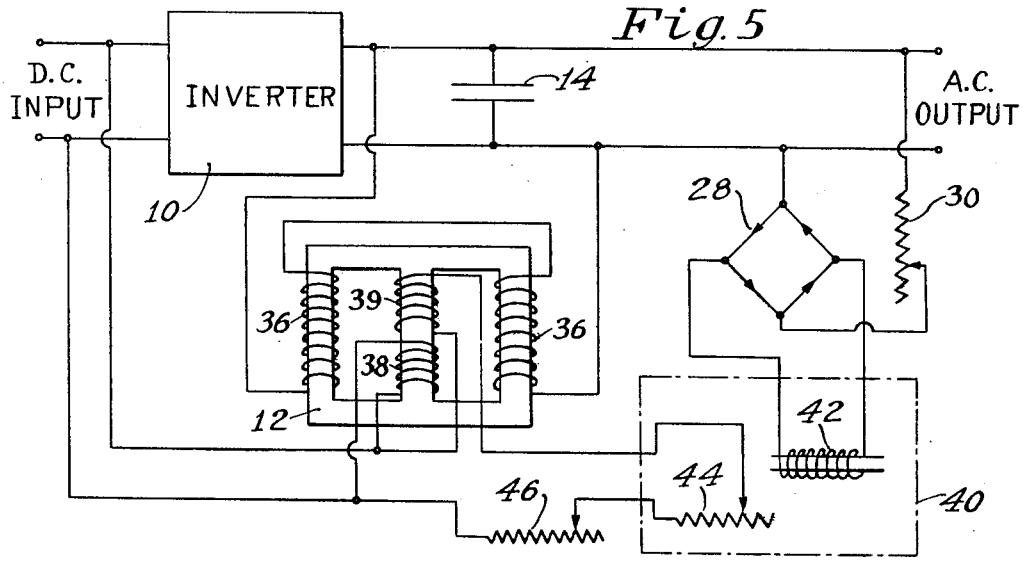
Figure 3:
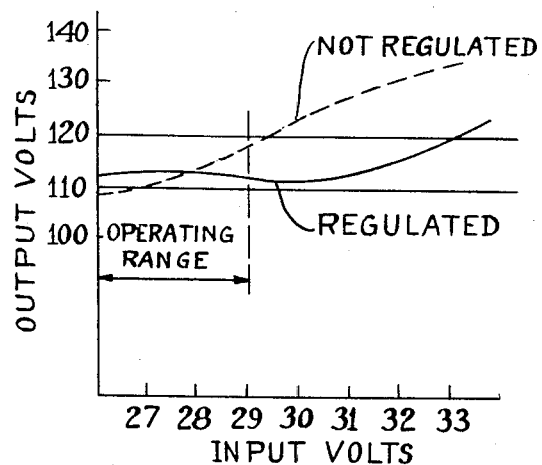
Figure 4:
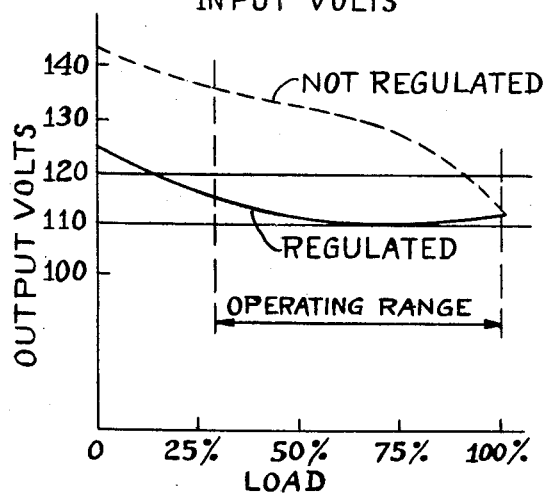

In the drawings illustrating the invention, Fig. 1 is a schematic wiring diagram of the voltage regulating system; Fig. 2 is a plot of curves affording a graphical representation of the mode of operation; Figs. 3 and 4 are representative plots showing the improvement in voltage regulation effected by the invention; and Fig. 5 is a schematic diagram of a modification of the system shown in Fig. 1.

The D. C. to A. C. inverter is indicated generally at 10, and may be of the conventional rotating type, supplied with power from storage batteries or other source of direct current, not illustrated. By way of example, the D. C. input may be of the order of 27.5 volts, with a normal operating range from 26 to 29 volts, while the A. C. output may be taken as 115 volts, 400 cycles, with operating limits of 110 to 120 volts.

The components which make up the compensating "load" circuit by which the inverter output voltage is regulated comprise a reactor 12 and a capacitor 14 connected across the inverter output and forming a parallel LC circuit. The reactor 12 is provided with a pair of series-connected A. C. windings 16 on the outer legs, the two coils being wound in opposite directions to cause cancellation of A. C. flux in the center leg of the core and thus prevent introducing an A. C. component into the D. C. system. The series-connected A. C. coils are connected across the inverter output and provide the inductive portion of the reactive load provided by the regulating system.

To vary the inductance of the control reactor and thereby provide a load that may be made capacitive or inductive, depending on whether the output voltage has fallen below or has risen above the desired value, the reactor is provided with a control coil 18 by which the saturation of the core may be varied. This coil is wound on the center leg of the core and is supplied with direct current from the D. C. supply. Control of current flow through the coil, and consequently the D. C. flux density in the core, is effected by means responsive to changes in output voltage of the inverter. A sensitive control, capable of causing a substantial change in control coil current upon a relatively small departure of output voltage from normal, is attained by an amplifier, preferably in the form of a magnetically actuated carbon-pile type variable resistor indicated generally by dot-and-dash outline 20. This resistor may be of conventional construction, comprising a solenoid 22 and a resistance element 24 so arranged that an increase in solenoid current causes a decrease in the resistance of element 24. Resistance 24, together with a manually adjustable resistor 26, is connected in series with the D. C. supply to the control coil.

The solenoid 22 is supplied with direct current from the inverter output by means of a rectifier, which may comprise rectifier elements 28 of the selenium or dry disc type, bridge connected for full wave rectification of the A. C. output voltage. The solenoid is connected across opposite arms of the bridge, while the other arms of the bridge are connected through an adjustable resistor 30 to the inverter output. The setting of resistor 30 determines the magnitude of the regulated output voltage.

The result of the above-described arrangement is that a rise in output voltage causes an increase in current through solenoid 22 and a consequent decrease in resistance 24. Because of the sensitive response which magnetically actuated carbon-pile type resistors are capable of providing, a substantial increase in current flow through the reactor control coil, and a corresponding increase in magnetization, may be caused by a relatively small increase in solenoid current, as occasioned by a slight rise in inverter output voltage. This increase in magnetization causes a decrease in inductance of the A. C. coils. Conversely, a fall in output voltage results in a decrease in D. C. magnetization and a consequent increase in inductance of the A. C. coils.

The circuit including the solenoid 22 is a measuring circuit, in which the rectified current is proportional to the output voltage. This rectified current is amplified by the amplifier 20, whereby the saturating current in the coil 18 is several times the current in the measuring circuit. Hence any change in the measuring circuit current is accompanied by a correspondingly greater change in the saturating current. It is thus possible to use a measuring circuit the impedance of which is high enough to impose no appreciable load increase on the inverter, while obtaining a sufficiently high saturating current so that slight changes in output voltage are accompanied by relatively large changes in saturating current.

The control provided by varying the D. C. flux is illustrated by the curves of Fig. 2, which may be regarded as typical. When the D. C. magnetizing force is large, due to high output voltage, operation is about a point relatively high on the magnetization curve, as at point $a$ on the knee of the curve. On the other hand, when the output voltage is low, the control coil current is likewise low, and operation is about a point on the steep portion of the curve, as at $b$. The number of turns in the A. C. windings 16 is large so that the A. C. flux excursions about the D. C. operating points are relatively small, with the result that the inductance of the A. C. coils, at any D. C. operating point, is given by the first derivative of the magnetization curve at that point. Accordingly, for operation about point $a$ on the knee of the magnetization curve the inductance of the A. C. coils is low, corresponding to point $a'$, while for low values of D. C. flux density, where the magnetization curve is steep, the inductance is high, since substantial changes in A. C. flux occur with only a small change in A. C. magnetizing current. Thus, for a D. C. flux density corresponding to point $b$, the inductance of the A. C. coils is given by point $b'$ on the inductance curve $X_L$. In either case, the A. C. excursion is so limited that only the first derivative of the magnetization curve is important, and hence the relation between A. C. flux and A. C. magnetizing current is substantially linear. As a consequence, there is no appreciable distortion of the wave form. By way of example, it has been found entirely practical to limit variation in the amplitude factor to the range from 1.35 to 1.45, indicating that the harmonic content due to nonlinearity is small.

Due to the substantial variation in the reactance of the A. C. coils upon a relatively slight change in inverter output voltage, the load presented to the inverter may be inductive or capacitive, depending on whether the output voltage has risen above or fallen below normal. Thus, for high output voltage, the reactance $X_L$ of the A. C. coils is less than the reactance, represented by dotted line $X_c$, of capacitor 14. The net reactance of the compensating circuit is thus inductive, and lagging current is drawn by the compensating circuit. This lagging current, passing through the impedance of the inverter coils, will produce a voltage drop, as will be obvious to those skilled in the art, thus restoring the output voltage toward normal. On the other hand, output voltage below normal results in an increase in inductance and the compensating load becomes capacitive, causing leading current to be drawn, which in passing through the inverter causes a voltage rise (negative voltage drop), thereby raising the output voltage toward normal.

In the operation of the system, the resistor 30 is so adjusted that the desired output voltage is obtained at normal load and rated input voltage. This serves to adjust the D. C. control coil current to a value such that under said conditions the reactance of the A. C. coils is substantially equal to the reactance of the capacitor 14. This condition ($X_L = X_c$) is indicated by point $c'$ in Fig. 2, and represents the condition in which the parallel tuned circuit is at resonance and therefore presents to the inverter a substantially pure resistive load of very high resistance and therefore of little effect on the inverter output. Any departure, however, from the operating point $c$ on the magnetization curve, due to change in output voltage, causes the load to become either inductively or capacitively reactive, depending on the direction of the departure, and thereby substantially compensate for the change.

The marked improvement in output voltage regulation effected by the control system is illustrated in Figs. 3 and 4 for changes in input voltage and output load respectively, over the normal operating range and also for excursions outside said range. The dotted line in each figure is for the output of an inverter without regulation, while the solid line shows the voltage with the regulating system in operation. Output voltage variations of not over 1½ volts at 100% load are shown to result as the input voltage varies between 26 and 29 volts, while at constant input voltage the load may be varied between 30% and 100% without exceeding a 2½ volt change in output voltage.

In certain cases it may prove more convenient to employ a magnetically actuated variable resistor in which the direction of operation is such that the resistance is increased upon an increase in solenoid or actuating current. For such cases, the arrangement illustrated in Fig. 5 may be employed. In this embodiment of the invention, the control reactor is provided with A. C. windings 36 similar to the coils 16 of the first described embodiment. Instead of a single control coil, however, two coils 38 and 39 are provided on the center leg of the core, and are wound and connected to act in flux opposition. One coil 38, termed the balance coil, is connected directly to the D. C. supply, while the control coil 39 is connected to the same source through the resistor element 44 of the control unit 40. A manually adjustable resistance 46 is likewise provided in the control coil circuit.

The resistance unit 40 may be of the magnetically actuated carbon-pile type, obtaining its actuating current from the inverter output in the same manner as in the first embodiment, but adapted to cause an increase in resistance of element 44, and thereby decrease the current through control coil 39, upon an increase in solenoid current. Since the flux of the control coil acts in opposition to the relatively constant flux produced by the balance coil 38, the result of a decrease in control coil flux is to increase the net D. C. flux in the reactor and thereby decrease the inductance of the A. C. coils, in the same fashion as the first described embodiment. Accordingly, upon an increase in inverter output voltage the A. C. inductance is decreased, and upon a fall in output voltage, the A. C. inductance is increased, just as with the single D. C. coil and the oppositely-acting control resistor 20 of the Fig. 1 embodiment.

In adjusting the apparatus of Fig. 5, resistor 30 sets the value of the regulated output voltage as before, while resistor 46 is so adjusted that at maximum load on the inverter, the D. C. flux developed by the control coil is substantially equal to and therefore cancels the D. C. flux developed by the balance coil, thereby providing the highest possible value of inductance under conditions of maximum inverter load. At rated load, the inductance is lower than this maximum and preferably is in resonance with the condenser 14.

The invention thus comprises a voltage regulating system for D. C. to A. C. inverters, wherein small deviations of output voltage from the desired value are caused to produce substantial variations in D. C. flux density of a control reactor forming the inductive component of a parallel LC circuit across the output of the inverter, whereby the circuit provides a capacitive reactance if the output voltage falls, and inductive reactance if the output voltage rises, and wherein the amplitude factor is maintained close to optimum over the entire control range by permitting only limited excursions of A. C. flux about any operating point on the reactor magnetization curve within said range. It will be understood that although an amplifier of the carbon-pile type is preferably used for reasons of simplicity and economy, other amplifier types may be employed.

I claim as my invention:

1. A voltage regulating system for an inverter having a direct current input and an alternating current output, said system comprising a compensating load having parallel-connected capacitance and inductance, said inductance being variable to vary the reactance of the compensating load and comprising a direct current saturating winding reactor, an energizing circuit for energizing the saturating winding with direct current from the input side of the inverter, and means under the control of the energizing circuit and responsive to small changes in inverter output voltage for varying the energization of the saturating winding to vary the inductance of the reactor.

2. A voltage regulating system for an inverter having a direct current input and an alternating current output, said system comprising a compensating load having parallel-connected capacitance and inductance, said inductance being variable to vary the reactance of the compensating load and comprising a direct current saturating winding reactor, an energizing circuit for energizing the saturating winding with direct current from the input side of the inverter, the inductance and capacitance being substantially in parallel resonance for a particular value of direct current magnetization, and means responsive to small changes in inverter output voltage for varying the energization of the saturating winding to vary the inductance of the reactor to cause the compensating load to become inductively reactive upon a rise in output voltage above the regulated voltage level and to become capacitively reactive upon a fall in output voltage below said regulated value, said means including an amplifier connected between the measuring circuit and the energizing circuit for causing a substantial increase in energizing circuit current upon a slight increase in inverter output voltage.

3. A voltage regulating system for an inverter having a direct current input and an alternating current output, said system comprising a compensating load having parallel-connected capacitance and inductance, said inductance being variable to vary the reactance of the compensating load and comprising a direct current saturating winding reactor, an energizing circuit for energizing the saturating winding with direct current from the input side of the inverter, a measuring circuit across the inverter output to carry a current which varies in accordance with the output voltage, and means for varying the energization of the saturating winding in accordance with changes in the current in the measuring circuit, said means including a balancing winding energized from the input side of the inverter and opposing magnetization due to the saturating winding, and amplifying means connected between the measuring circuit and the energizing circuit and arranged to cause a substantial decrease in energizing circuit current upon a slight increase in inverter output voltage.

SIMON SARETZKY.

REFERENCES CITED

The following references are of record in the file of this patent:

UNITED STATES PATENTS

| Number | Name | Date |
|---|---|---|
| 2,015,556 | Fountain | Sept. 24, 19 |
| 2,039,044 | Wolfert et al. | Apr. 28, 19 |
| 2,040,684 | Boyajian | May 12, 19 |
| 2,278,151 | Runaldue | Mar. 31, 19 |
| 2,287,755 | Barth | June 23, 19 |